June 29, 1937.  H. A. HUSTED  2,085,023
IDENTIFICATION MEANS FOR STEERING WHEELS AND THE LIKE
Filed May 14, 1935  2 Sheets-Sheet 1
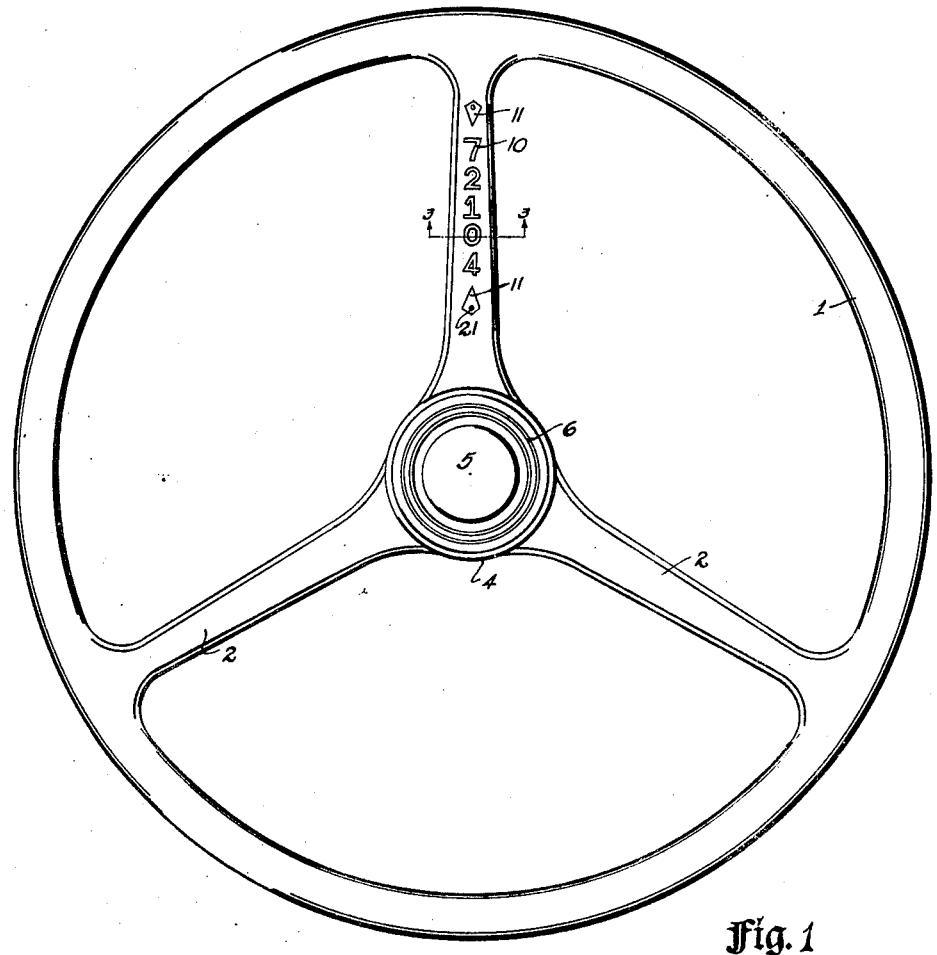
Fig. 1
Fig. 3
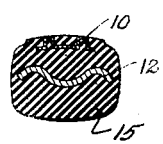
Fig. 4
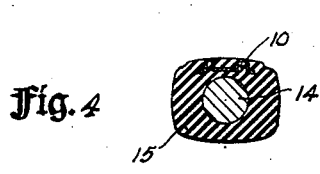
Fig. 10
Fig. 11
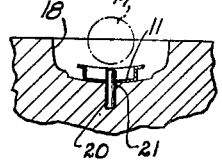
Harry A. Husted, INVENTOR
By Justin W. Macklin ATTORNEY June 29, 1937.                H. A. HUSTED                2,085,023
IDENTIFICATION MEANS FOR STEERING WHEELS AND THE LIKE
Filed May 14, 1935              2 Sheets-Sheet 2

Harry A. Husted, INVENTOR
BY Justin W. Macklin, ATTORNEY

Patented June 29, 1937

2,085,023

UNITED STATES PATENT OFFICE 2,085,023

IDENTIFICATION MEANS FOR STEERING WHEELS AND THE LIKE

Harry A. Husted, Akron, Ohio, assignor, by mesne assignments, to Dr. James S. Reid, Cleveland, Ohio, as trustee Application May 14, 1935, Serial No. 21,465

5 Claims. (Cl. 40—2.2)

The present invention relates to means adapted to be associated with steering wheels for automobiles for identification purposes for discouraging theft and to aid in the recovery of the stolen vehicles.

The general objects are stated in my prior Patent No. 2,001,349, issued May 14, 1935.

The specific objects of the present invention include convenient application of such identifying means to steering wheels and parts thereof and which may be cheaply manufactured and easily and permanently applied; more specifically to provide variations for applying such numbers either on the steering wheel spoke or body of material forming the outer portion of the spoke as well as identifying the horn buttons and the like.

As stated in my prior application such identification means may be read through the closed windows of an automobile and because of the warning resulting from the visible identifying number or the like, theft of a car bearing such identification means is avoided. Correspondingly, insurance rates on cars so equipped may be lowered.

A further object similar to objects stated in my prior application is to render the identification number or character difficult of removal without showing the results of attempted alteration.

In the drawings,

Fig. 1 is a plan view of a steering wheel with the identification number on the upper portion of the spoke.

Fig. 3 is a vertical transfer section slightly enlarged taken on the plane indicated by the line 3—3 of Fig. 1.

Fig. 4 is a similar view showing a different spoke construction.

Figs. 10 and 11 are transverse fragmentary sections through a mold member showing means for locating a number prior to applying plastic material to a spoke, such as shown in Fig. 4.

Figure 2:
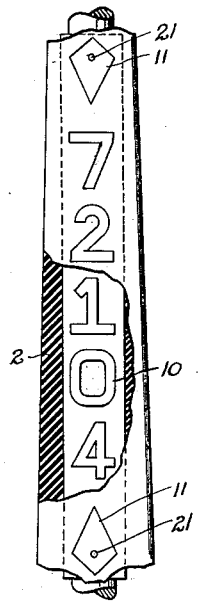
Fig. 2 is a fragmentary segment somewhat enlarged showing a detail of such number plate.

Describing the structure shown in the drawings by the use of reference numerals, a steering wheel of the usual present day construction is shown in Fig. 1 as having a rim 1, spokes 2, hub portion 4, and horn button 5.

On one of the spokes is shown the identifying character comprising for illustration numerals 10 with decorative members 11 at either end to preclude attempts to alter the number by extending it.

On such numbers 10 may be applied to spokes of the type of Figs. 3 or 4 the one having pressed metal core 12 the other the spoke of the wheel spider being formed of a round rod 14, in each case plastic material such as hard rubber or any thermoplastic material 15, may constitute a coating or body of the spoke.

The numbers 10 are shown as raised from and formed intervally by embossing on a light thin metallic plate. These may be previously located in the mold cavity such as indicated at 18 while pins as at 20 may pass through small openings as at 21 of Figs. 1, 2, and 11, to locate the number strip while the material 15 is formed in the cavity around the spoke. As shown in Fig. 10 the elements 11 may be raised slightly above the finished surface of the spoke and correspondingly fit into depressions of the cavity 18 thus locating the strip during the molding process.

It will be seen that when so molded into the material it is only by molding equipment that such a number strip could be removed and replaced, thus when the wheel is secured as by spot welding on to the steering column, alteration is very difficult.

Figure 5:
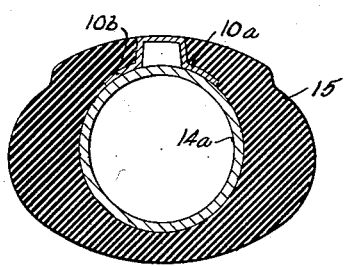
Fig. 5 is a still further enlarged section of a hollow spoke with the number plate.

The form shown in Fig. 5 corresponds more nearly to that described in my above designated co-pending application. It illustrates a form of strip 10a having a raised number portion flush with the surface of the material 15 while the spoke 14a is hollow instead of solid rod, and the side flanges or base of the strip 10b fit over the surface of the spoke. This strip may be permanently secured as by welding, soldering or the like to the spoke member 14a.

Figure 6:
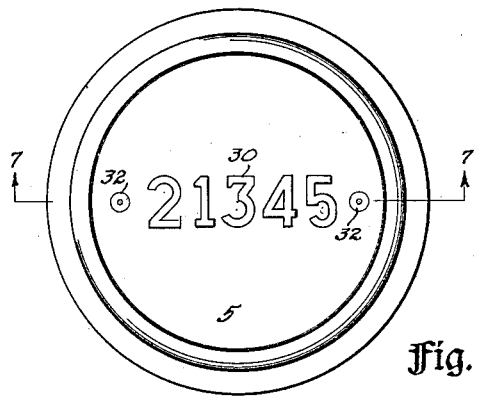
Fig. 6 is a plan view of a horn button having an identification thereon.
Figure 7:
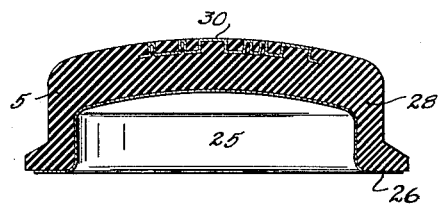
Fig. 7 is a section taken on the line 7—7 of Fig. 6.

In the horn button arrangement of Figs. 6 and 7 a cap shaped member 25 having a flange 26 forms the core and incidentally the usual contact member of the button. On it is molded suitable plastic material 28 in which the number strip 30 with its characters showing as appears in Fig. 6 flush with the surface is molded. The number strip may have both numerals as appears and embossed raised symbols or circles as at 32, through which are small openings suitable for receiving locating pins in the mold, thus positioning the number during the molding of the plastic material 28.

Figure 8:
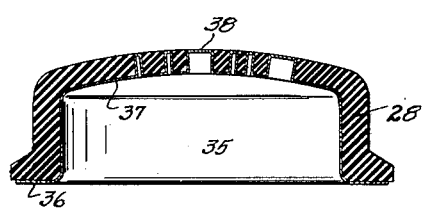
Fig. 8 is a section similar to Fig. 7 showing a modified form of the horn button number arrangement.
Figure 9:
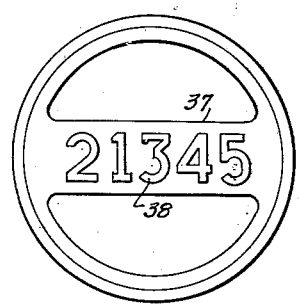
Fig. 9 is a plan of the metallic member of the modified form of Fig. 8.

In the forms shown in Figs. 8 and 9, the contact portion of the cap preferably is formed of a cylindrical part 35 and a flange 36 and central bridge member 37, on which the numerals 38 are embossed. The plastic material 28 may then be molded on to that frame, leaving the numbers flush as there appears. Such horn buttons are usually secured by a screw ring as indicated at 6 in Fig. 1, and by permanently affixing this ring to the button when applied, it requires replacement of these parts and as with the steering wheels replacement may be done only through registered agencies effecting alteration.

From the foregoing description it will be seen that the above are practical, commercial, useful modifications of the subject matter of my application of which this may be considered a continuation in part.

Further modifications may be made without departing from the spirit of my invention.

Having thus described my invention, what I claim is:

1. An automobile steering wheel horn button having a frame member and molded coating thereon, the frame having embossed characters integral with the frame which project through the coating and appear at the surface thereof.

2. An article having a sheet metal frame with identification characters embossed in the surface thereof and a coating of plastic material molded around said frame, said characters projecting through said coating to the outer surface of said article.

3. An article having a hollow metallic frame with raised characters embossed in the surface thereof, and a coating of plastic material molded to said frame, the thickness of said coating being substantially equal to the height of said raised characters.

4. An automobile horn button having a sheet metal frame, raised identification characters embossed in the surface of said frame, and a coating of thermoplastic material molded to the frame, the upper surface of said raised characters being flush with the outer surface of said coating.

5. A steering wheel horn button having a substantially cylindrical bilged frame of sheet metal, a plurality of raised identification characters embossed in the bilged portion of said frame, said frame having a coating of thermoplastic material, and said characters being visible at the surface of said coating.

HARRY A. HUSTED.